United States Patent
Su et al.

(10) Patent No.: US 9,077,175 B2
(45) Date of Patent: Jul. 7, 2015

(54) ELECTRONIC FUSE CIRCUIT AND METHOD OF CONTROLLING THE SAME

(71) Applicant: EATON CORPORATION, Cleveland, OH (US)

(72) Inventors: Nan Su, Suzhou (CN); Jiankun Xin, Suzhou (CN); Zhenbo Chen, Suzhou (CN); Yibo Chen, Suzhou (CN)

(73) Assignee: EATON CORPORATION, Cleveland, OH (US)

( * ) Notice: Subject to any disclaimer, the term of this patent is extended or adjusted under 35 U.S.C. 154(b) by 175 days.

(21) Appl. No.: 13/936,303

(22) Filed: Jul. 8, 2013

(65) Prior Publication Data

US 2015/0009597 A1 Jan. 8, 2015

(51) Int. Cl.

| H02H 3/10 | (2006.01) |
| H02H 3/093 | (2006.01) |
| H01H 71/12 | (2006.01) |
| H02H 3/027 | (2006.01) |
| H02H 3/087 | (2006.01) |

(52) U.S. Cl.
CPC .............. *H02H 3/10* (2013.01); *H02H 3/093* (2013.01); *H01H 71/123* (2013.01); *H02H 3/027* (2013.01); *H02H 3/087* (2013.01)

(58) Field of Classification Search
CPC ......... H02H 3/10; H02H 3/093; H02H 7/224; H01H 71/123
USPC ........................................ 361/93.2
See application file for complete search history.

(56) References Cited

U.S. PATENT DOCUMENTS

| 4,329,600 | A | 5/1982 | Stewart |
| 4,423,457 | A | 12/1983 | Brajder |
| 4,695,915 | A | 9/1987 | Mahalek et al. |
| 7,385,794 | B2 * | 6/2008 | Kashine .......................... 361/79 |
| 2004/0174648 | A1 * | 9/2004 | Frey et al. ....................... 361/90 |
| 2005/0273207 | A1 | 12/2005 | Dougherty |
| 2006/0279884 | A1 | 12/2006 | Valdes et al. |
| 2007/0008670 | A1 | 1/2007 | Fletcher et al. |
| 2008/0247107 | A1 * | 10/2008 | Lin et al. ......................... 361/59 |
| 2013/0057247 | A1 | 3/2013 | Russell et al. |

FOREIGN PATENT DOCUMENTS

EP    0 279 691 A2    8/1988

OTHER PUBLICATIONS

European Patent Office, "International Search Report and Written Opinion", Oct. 16, 2014, 11 pp.

* cited by examiner

*Primary Examiner* — Scott Bauer
(74) *Attorney, Agent, or Firm* — Eckert Seamans Cherin & Mellott, LLC; Nathaniel C. Wilks

(57) ABSTRACT

An electronic fuse circuit for interrupting a current flowing through a power circuit includes: a trip switch structured to open and close to interrupt and permit, respectively, the current flowing through the power circuit; a current sensing circuit structured to sense when a magnitude of the current flowing through the power circuit is greater than a predetermined magnitude; a trip circuit structured to control the trip switch to open and close based on the sensed magnitude of the current flowing through the power circuit; and a processor having a routine structured to monitor a characteristic of the trip circuit and, when the monitored characteristic meets a predetermined criteria, to enter an override mode and control the trip circuit to control the trip switch to open regardless of the magnitude of the current flowing through the power circuit.

20 Claims, 3 Drawing Sheets

ELECTRONIC FUSE CIRCUIT AND METHOD OF CONTROLLING THE SAME

BACKGROUND

1. Field

The disclosed concept relates generally to fuses and, more particularly, to fuse circuits for interrupting current flowing through a power circuit. The disclosed concept also relates to methods of controlling fuse circuits.

2. Background Information

Fuses have been employed to protect power circuits from over-current conditions. One type of fuse includes a conductive element which is connected in series with the protected power circuit. The conductive element heats up due to current flowing therethrough. The fuse is designed such that when the current flowing through the power circuit exceeds a predetermined level, the conductive element becomes hot enough to melt and interrupt the current flowing through the power circuit.

However, it is difficult to control the precise level of current at which the element of the fuse will melt and interrupt current flow. Additionally, it takes time for the element of the fuse to sufficiently heat up and melt. Thus, it is difficult to control or reduce the response time of the fuse. Furthermore, once the fuse is blown, at least the conductive element of the fuse needs to be replaced in order for the fuse to be usable again.

There is room for improvement in fuse circuits.

There is also room for improvement in methods of controlling fuse circuits.

SUMMARY

These needs and others are met by aspects of the disclosed concept which provide an electronic fuse circuit for interrupting a current flowing through a power circuit. These needs and others are also met by aspects of the disclosed concept which provide a method for controlling an electronic fuse circuit and a non-transitory computer readable medium including the same.

In accordance with aspects of the disclosed concept, an electronic fuse circuit for interrupting a current flowing through a power circuit comprises: a trip switch structured to open to interrupt the current flowing through the power circuit and to close to permit the current to flow through the power circuit; a current sensing circuit structured to sense when a magnitude of the current flowing through the power circuit is greater than a predetermined magnitude; a trip circuit structured to control the trip switch to open in response to the current sensing circuit sensing that the magnitude of the current flowing through the power circuit is greater than the predetermined magnitude and to control the trip switch to close when the current sensing circuit does not sense that the magnitude of the current flowing through the power circuit is greater than the predetermined magnitude; and a processor having a routine, the routine being structured to monitor a characteristic of the trip circuit and, when the monitored characteristic meets a predetermined criteria, to enter an override mode and control the trip circuit to control the trip switch to open regardless of the magnitude of the current flowing through the power circuit.

In accordance with other aspects of the disclosed concept, a method controls an electronic fuse circuit configured to interrupt a current flowing through a power circuit, the electronic fuse circuit including a trip switch structured to open to interrupt the current flowing through the power circuit and to close to permit the current to flow through the power circuit, and a trip circuit structured to control the trip switch based on a magnitude of the current flowing through the power circuit. The method comprises: monitoring a characteristic of the trip circuit; determining whether the characteristic of the trip circuit meets a predetermined criteria; and entering an override mode in which the trip circuit controls the trip switch to open regardless of the magnitude of the current flowing through the power circuit and controlling the trip circuit to open the trip switch.

In accordance with other aspects of the disclosed concept, a non-transitory computer readable medium stores one or more programs, including instructions, which when executed by a computer, causes the computer to perform a method of controlling an electronic fuse circuit configured to interrupt a current flowing through a power circuit, the electronic fuse circuit including a trip switch structured to open to interrupt the current flowing through the power circuit and to close to permit the current to flow through the power circuit and a trip circuit structured to control the trip switch based on a magnitude of the current flowing through the power circuit. The method comprises: monitoring a characteristic of the trip circuit; determining whether the characteristic of the trip circuit meets a predetermined criteria; and entering an override mode in which the trip circuit controls the trip switch to open regardless of the magnitude of the current flowing through the power circuit and controlling the trip circuit to open the trip switch.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

Figure 1:
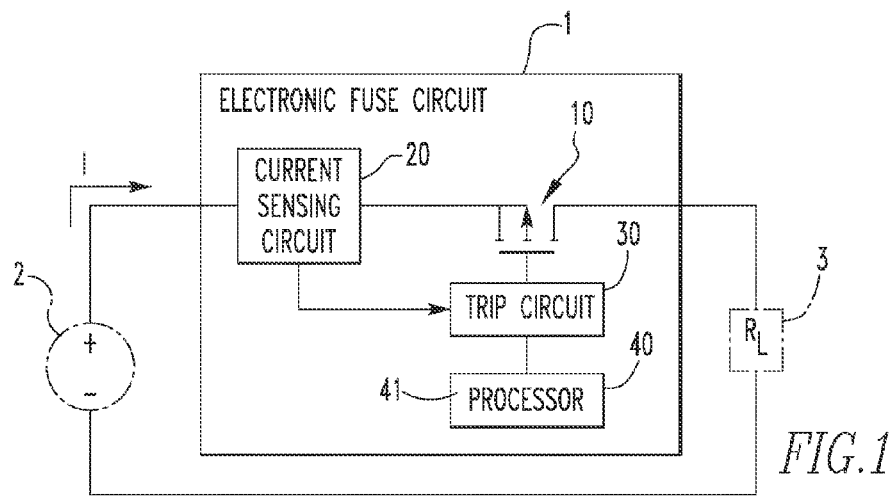
FIG. 1 is a block diagram in schematic form of an electronic fuse circuit in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

As employed herein, the term "number" shall mean one or an integer greater than one (i.e., a plurality).

As employed herein, the term "processor" shall mean a programmable analog and/or digital device that can store, retrieve and process data; a controller; a control circuit; a computer; a workstation; a personal computer; a digital signal processor; a microprocessor; a microcontroller; a microcomputer; a central processing unit; a mainframe computer; a mini-computer; a server; a networked processor; or any suitable processing device or apparatus.

Referring to FIG. 1, an electronic fuse circuit 1 is electrically connected to a power circuit including a power source 2 and a load 3. The electronic fuse circuit 1 is configured to interrupt the current I flowing through the power circuit.

The electronic fuse circuit 1 includes a trip switch 10 (e.g., without limitation, a metal-oxide-semiconductor field-effect transistor), a current sensing circuit 20, a trip circuit 30, and a processor 40. The trip switch 10 is structured to open to interrupt the current I flowing through the power circuit and to close to permit the current I to flow through the power circuit. The current sensing circuit 20 is structured to sense when a magnitude of the current I is greater than a predetermined magnitude. The trip circuit 30 is configured to control operation of the trip switch 10. When the magnitude of the current I is less than the predetermined magnitude, the trip circuit 30 controls the trip switch 10 to close, and when the magnitude of the current I is greater than the predetermined magnitude (e.g., without limitation, an over-current condition in the power circuit; 350 mA; any suitable current value), the trip circuit 30 controls the trip switch 10 to open and interrupt the current I flowing in the power circuit.

The processor 40 includes a routine 41 structured to monitor a characteristic of the trip circuit 30 and, when the monitored characteristic meets a predetermined criteria, to enter an override mode and control the trip circuit 30 to control the trip switch 10 to open regardless of the magnitude of the current I. After a predetermined period of time, the routine 41 exits the override mode and resumes monitoring the characteristic of the trip circuit 30. Also, when the routine 41 exits the override mode, the trip circuit 30 resumes controlling the trip switch 10 based on the magnitude of the current I flowing in the power circuit.

Figure 2:
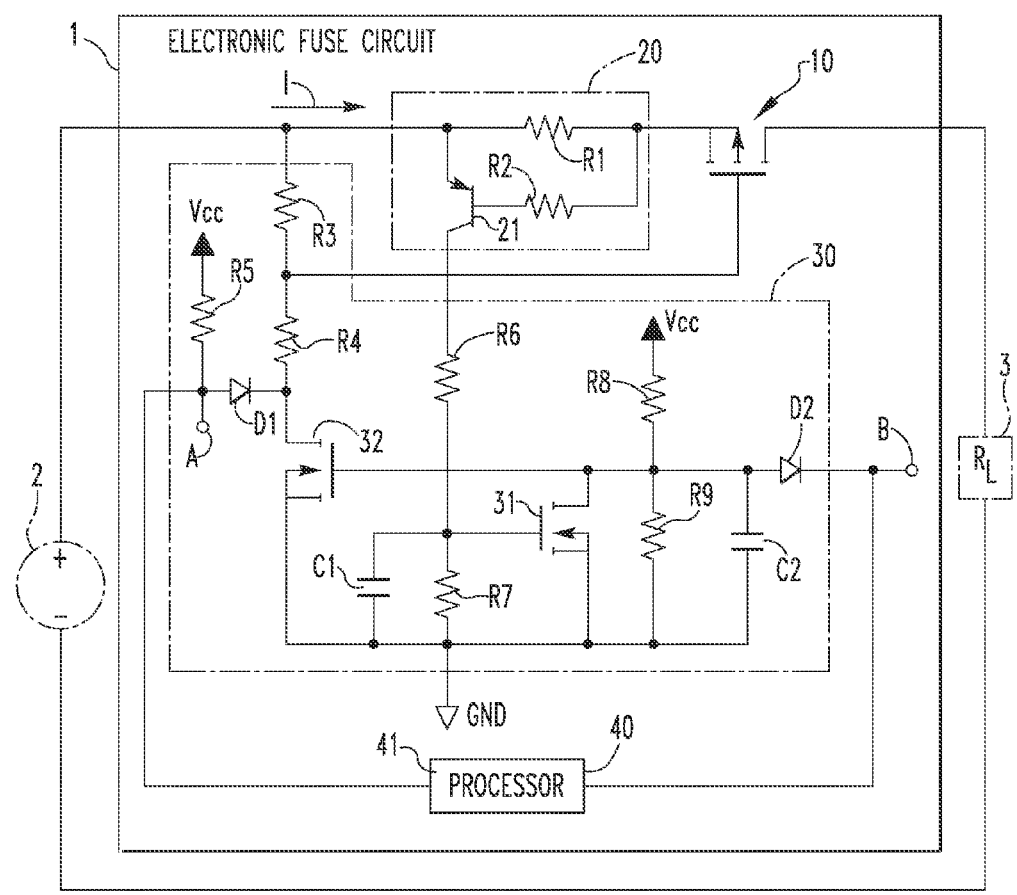
FIG. 2 is a circuit diagram of an electronic fuse circuit for a power circuit in accordance with an example embodiment of the disclosed concept.

Referring to FIG. 2, a circuit diagram of the electronic fuse circuit 10 in accordance with an example embodiment of the disclosed concept shows circuit components of the current sensing circuit 20 and the trip circuit 30 in more detail. The current sensing circuit 20 includes first and second resistors R1,R2 and a first switch 21 (e.g., without limitation, a bipolar junction transistor). The first resistor R1 is electrically connected in series with the power circuit and the second resistor R2 is electrically connected between the power circuit and the first switch 21. Resistance values of the first and second resistors R1,R2 are selected such that the first switch 21 closes when the magnitude of the current I is greater than the predetermined magnitude. When the first switch 21 closes, the current sensing circuit 20 outputs a signal to the trip circuit 30. The signal indicates to the trip circuit 30 that the magnitude of the current I is greater than the predetermined magnitude.

The trip circuit 30 includes second and third switches 31,32 (e.g., without limitation, metal-oxide-semiconductor field-effect transistors). The trip circuit 30 further includes resistors R3,R4,R5,R6,R7,R8,R9, capacitors C1,C2, and diodes D1,D2. The trip circuit 30 is also electrically connected to a supply voltage $V_{CC}$ and a ground GND which may be provided by a power supply (not shown).

When the trip circuit 30 receives the signal from the current sensing circuit 20, the second switch 31 closes. Closing of the second switch 31 causes the third switch 32 to open, which in turn causes the trip circuit 30 to control the trip switch 10 to open and interrupt the current I flowing through the power circuit. When the trip switch opens and interrupts the current I, the magnitude of the current I will fall below the predetermined magnitude leading to the trip circuit 30 controlling the trip switch 10 to close and permit the current I to flow through the power circuit. However, if there is a condition in the power circuit that causes the magnitude of the current I to continue to rise above the predetermined magnitude each time the trip switch 10 is closed, the trip circuit 30 will repeatedly open and close the trip switch 30.

In order to detect when the trip circuit 30 controls the trip switch 10 to close, the routine 41 of the processor 40 monitors a characteristic of the trip circuit and determines whether the monitored characteristic meets a predetermined criteria. For example and without limitation, the routine 41 monitors a voltage signal at a first node A. When the routine 41 detects a change in voltage at node A (e.g., without limitation, a rise in voltage), the routine 41 enters an override mode. In the override mode, the routine 41 controls the trip circuit 30 to control the trip switch 10 to open regardless of the magnitude of the current I. For example and without limitation, the routine 41 outputs a low signal to a second node B which causes the third switch 32 to open, thus causing trip switch 10 to open.

The routine 41 may wait a first predetermined period of time (e.g., without limitation, a trip time; 20 ms; any suitable time) before entering the override mode. After entering the override mode, the routine 41 waits a second predetermined period time (e.g., without limitation, a recovery time; 5 s; any suitable time) before exiting the override mode and permitting the trip circuit 30 to once again control the trip switch 10 based on the magnitude of the current I.

While particular circuit components and a particular arrangement of the circuit components for the electronic fuse circuit 1 of FIG. 2 are disclosed, it should be appreciated that the disclosed concept is not limited thereto. It should be appreciated that various selections of suitable components and arrangements may be employed in the electronic fuse circuit 1 without departing from the scope of the disclosed concept.

Figure 3A:
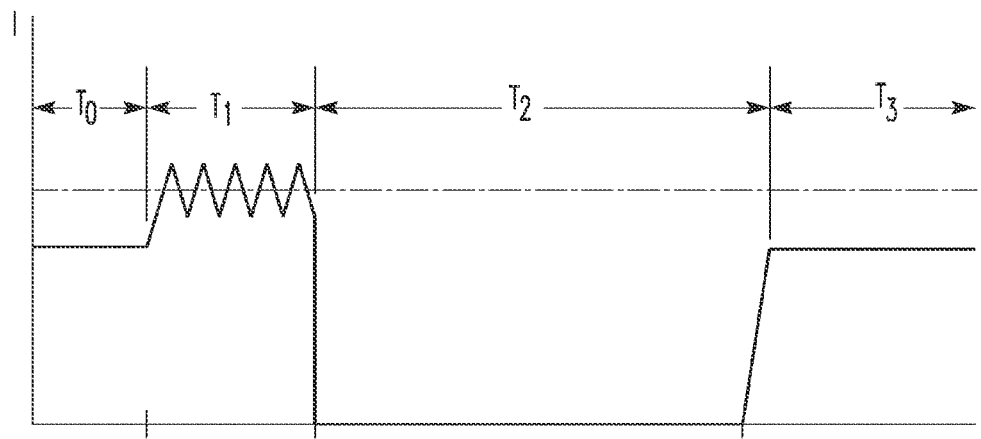
FIG. 3A is a plot of the current flowing through the power circuit of FIG. 2.
Figure 3B:
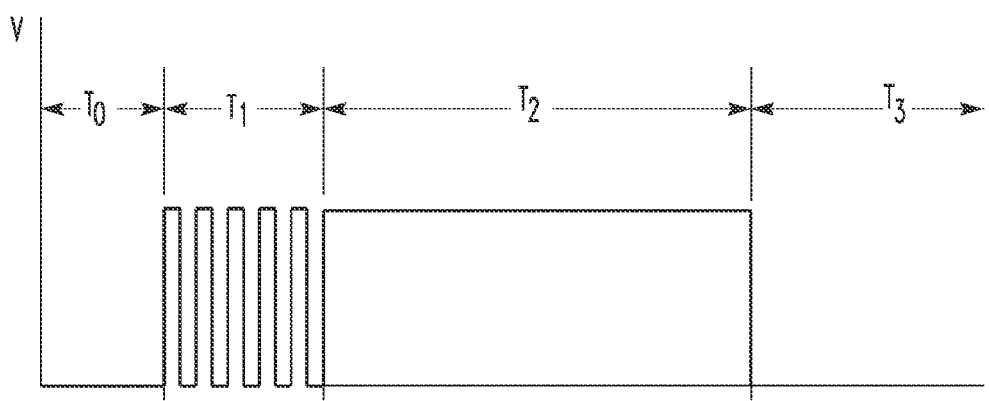
FIG. 3B is a plot of the voltage at node A of FIG. 2.
Figure 3C:
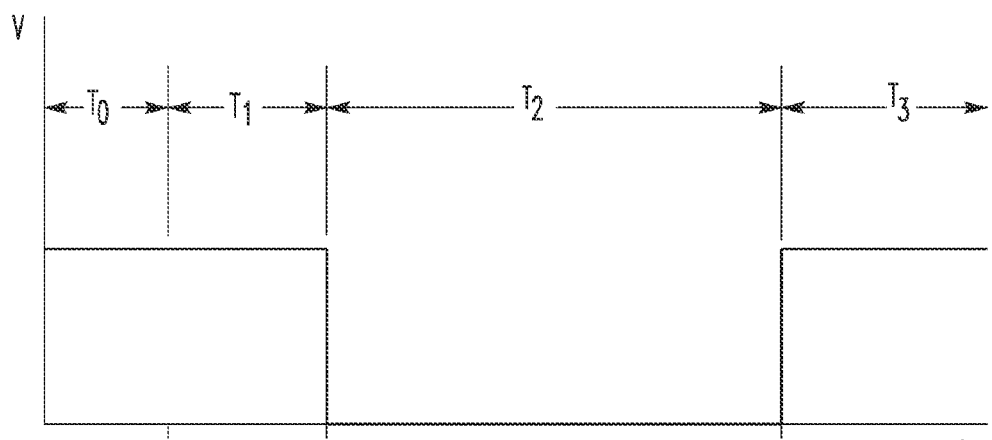
FIG. 3C is a plot of the voltage at node B of FIG. 2.

An example operation of the electronic fuse circuit 1 over a period of time will now be described with reference to the plots shown in FIGS. 3A, 3B, and 3C. The plots are broken into four periods of time, an initial period of time $T_0$, the first predetermined period of time $T_1$, the second predetermined period of time $T_2$, and a third period of time $T_3$. In FIG. 3A, the magnitude of the current I is shown as a solid line and the predetermined magnitude is shown as a dashed line. In FIG. 3B, the voltage signal at the first node A of FIG. 2 is shown. In FIG. 3C, a voltage at the second node B of FIG. 2 is shown.

During the initial period of time $T_0$, the magnitude of the current I is less than the predetermined magnitude. At the end of the initial period of time $T_0$, the magnitude of the current I becomes greater than the predetermined magnitude. When the magnitude of the current I becomes greater than the predetermined magnitude, the voltage at the first node A rises, as shown in FIG. 3B, due to the third switch 32 opening. During the first predetermined period of time the magnitude of the current I and the voltage signal at the first node A oscillate due to the trip switch 10 being repeatedly opened and closed by the trip circuit 30.

After the first predetermined period of time $T_1$, the routine 41 of the processor 40 enters the override mode and outputs a low signal to the second node B, as shown in FIG. 3C. The low signal at the second node B causes the voltage signal at the first node A to remain high, which in turn causes the trip switch 10 and the magnitude of the current I to fall. Throughout the second predetermined period of time $T_2$, this condition remains constant.

At the end of the second predetermined period of time $T_2$, the routine 41 exits the override mode and removes the low signal from the second node B, as shown in FIG. 3C. Removing the low signal from the second node B causes the voltage signal at the first node A to drop and cause the trip switch 10 to close. By closing the trip switch 10, the magnitude of the current I is able to rise, as shown in FIG. 3A. During the third period of time $T_1$, as in the initial period of time $T_0$, the trip circuit 30 once again controls the trip switch 10 based on the magnitude of the current I.

Figure 4:
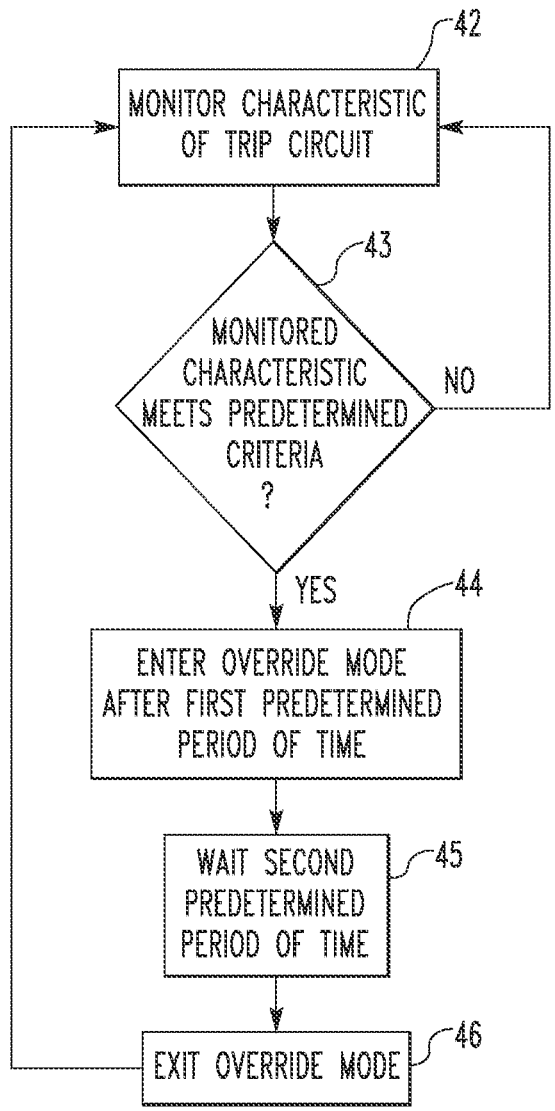
FIG. 4 is a flowchart of a method of controlling an electronic fuse circuit in accordance with embodiments of the disclosed concept.

FIG. 4 shows the routine 41 of the processor 40. The routine 41 starts by monitoring a characteristic of the trip circuit 30 at 42. The routine 41 then determines whether the monitored characteristic meets a predetermined criteria at 43. When the monitored characteristic meets the predetermined criteria, the routine 41 enters the override mode after a first predetermined period of time in 44. The routine 41 then waits a second predetermined period of time at 45 before exiting the override mode at 46. After exiting the override mode, the routine 41 returns to monitoring the characteristic of the trip circuit 30.

The disclosed concept can also be embodied as computer readable codes on a tangible, non-transitory computer readable recording medium. The computer readable recording medium is any data storage device that can store data which can be thereafter read by a computer system. Non-limiting examples of the computer readable recording medium include read-only memory (ROM), non-volatile random-access memory (RAM), CD-ROMs, magnetic tapes, floppy disks, disk storage devices, and optical data storage devices.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. An electronic fuse circuit for interrupting a current flowing through a power circuit, the electronic fuse circuit comprising:
   a trip switch structured to open to interrupt the current flowing through the power circuit and to close to permit the current to flow through the power circuit;
   a current sensing circuit structured to sense when a magnitude of the current flowing through the power circuit is greater than a predetermined magnitude;
   a trip circuit structured to control the trip switch to open in response to the current sensing circuit sensing that the magnitude of the current flowing through the power circuit is greater than the predetermined magnitude and to control the trip switch to close when the current sensing circuit does not sense that the magnitude of the current flowing through the power circuit is greater than the predetermined magnitude; and
   a processor having a routine, the routine being structured to monitor a characteristic of the trip circuit and, when the monitored characteristic meets a predetermined criteria, to enter an override mode,
   wherein, in the override mode, the processor is structured to output a signal to the trip circuit which forces the trip circuit to control the trip switch to open and remain open regardless of the magnitude of the current flowing through the power circuit.

2. The electronic fuse circuit of claim 1, wherein the routine of the processor is further structured to enter the override mode a first predetermined period of time after the monitored characteristic meets the predetermined criteria.

3. The electronic fuse circuit of claim 1, wherein the routine of the processor is further structured to exit the override mode a second predetermined time after entering the override mode, and to resume monitoring the characteristic of the trip circuit.

4. The electronic fuse circuit of claim 1, wherein the trip circuit includes a node; wherein the monitored characteristic of the trip circuit is a voltage signal at the node; and wherein the predetermined criteria is a change in a magnitude of the voltage signal at the node.

5. The electronic fuse circuit of claim 1, wherein the current sensing circuit includes a first resistor, a second resistor, and a first switch; and wherein when the magnitude of the current flowing through the power circuit is greater than the predetermined magnitude, the first switch closes and outputs a signal to the trip circuit.

6. The electronic fuse circuit of claim 5, wherein the first switch is a bipolar junction transistor.

7. The electronic fuse circuit of claim 1, wherein the trip switch is a metal-oxide-semiconductor field-effect transistor.

8. An electronic fuse circuit for interrupting a current flowing through a power circuit, the electronic fuse circuit comprising:
   a trip switch structured to open to interrupt the current flowing through the power circuit and to close to permit the current to flow through the power circuit;
   a current sensing circuit structured to sense when a magnitude of the current flowing through the power circuit is greater than a predetermined magnitude;
   a trip circuit structured to control the trip switch to open in response to the current sensing circuit sensing that the magnitude of the current flowing through the power circuit is greater than the predetermined magnitude and to control the trip switch to close when the current sensing circuit does not sense that the magnitude of the current flowing through the power circuit is greater than the predetermined magnitude; and
   a processor having a routine, the routine being structured to monitor a characteristic of the trip circuit and, when the monitored characteristic meets a predetermined criteria, to enter an override mode and control the trip circuit to control the trip switch to open regardless of the magnitude of the current flowing through the power circuit,
   wherein the trip circuit includes a second switch and a third switch; wherein the third switch is configured to open when the second switch closes; and wherein when the third switch is open, the trip circuit controls the trip switch to open.

9. The electronic fuse circuit of claim 8, wherein the third switch is electrically coupled to the processor; and wherein the routine of the processor is configured to control the third switch to open when in the override mode.

10. The electronic fuse circuit of claim 8, wherein the second switch and the third switch are metal-oxide-semiconductor field-effect transistors.

11. A method of controlling an electronic fuse circuit configured to interrupt a current flowing through a power circuit, the electronic fuse circuit including a trip switch structured to open to interrupt the current flowing through the power circuit and to close to permit the current to flow through the power circuit, and a trip circuit structured to control the trip switch based on a magnitude of the current flowing through the power circuit, the method comprising:
   monitoring a characteristic of the trip circuit;
   determining whether the characteristic of the trip circuit meets a predetermined criteria; and entering an override mode and, in the override mode, outputting a signal to the trip circuit which forces the trip circuit to control the trip switch to open and remain open regardless of the magnitude of the current flowing through the power circuit and controlling the trip circuit to open the trip switch.

12. The method of claim 11, wherein said entering the override mode further includes entering the override mode a first predetermined period of time after the monitored characteristic meets the predetermined criteria.

13. The method of claim 11, further comprising:
exiting the override mode and permitting the trip circuit to control the trip switch based on a magnitude of the current flowing through the power circuit.

14. The method of claim 13, wherein said exiting the override mode further includes exiting the override mode a second predetermined time after entering the override mode and resuming monitoring the characteristic of the trip circuit.

15. The method of claim 11, wherein the trip circuit includes a node; wherein the monitored characteristic of the trip circuit is a voltage signal at the node; and wherein the predetermined criteria is a change in a magnitude of the voltage signal at the node.

16. A non-transitory computer readable medium storing one or more programs, including instructions, which when executed by a computer, causes the computer to perform a method of controlling an electronic fuse circuit configured to interrupt a current flowing through a power circuit, the electronic fuse circuit including a trip switch structured to open to interrupt the current flowing through the power circuit and to close to permit the current to flow through the power circuit and a trip circuit structured to control the trip switch based on a magnitude of the current flowing through the power circuit, the method comprising:
monitoring a characteristic of the trip circuit;
determining whether the characteristic of the trip circuit meets a predetermined criteria; and
entering an override mode and, in the override mode, outputting a signal to the trip circuit which forces the trip circuit to control the trip switch to open and remain open regardless of the magnitude of the current flowing through the power circuit and controlling the trip circuit to open the trip switch.

17. The non-transitory computer readable medium of claim 16, wherein said entering the override mode further includes entering the override mode a first predetermined period of time after the monitored characteristic meets the predetermined criteria.

18. The non-transitory computer readable medium of claim 16, further comprising:
exiting the override mode and permitting the trip circuit to control the trip switch based on a magnitude of the current flowing through the power circuit.

19. The non-transitory computer readable medium of claim 18, wherein said exiting the override mode further includes exiting the override mode a second predetermined time after entering the override mode and resuming monitoring the characteristic of the trip circuit.

20. The non-transitory computer readable medium of claim 16, wherein the trip circuit includes a node; wherein the monitored characteristic of the trip circuit is a voltage signal at the node; and wherein the predetermined criteria is a change in a magnitude of the voltage signal at the node.

* * * * *